US009633384B2

(12) United States Patent
Casey

(10) Patent No.: US 9,633,384 B2
(45) Date of Patent: Apr. 25, 2017

(54) SYSTEMS AND METHODS FOR VIRTUAL MARKETS WITH PRODUCT PICKUP

(75) Inventor: Ginger Casey, Bratenahl, OH (US)

(73) Assignee: Ginger Casey, Santa Fe, NM (US)

( * ) Notice: Subject to any disclaimer, the term of this patent is extended or adjusted under 35 U.S.C. 154(b) by 1095 days.

(21) Appl. No.: 12/909,580

(22) Filed: Oct. 21, 2010

(65) Prior Publication Data

US 2011/0035299 A1 Feb. 10, 2011

Related U.S. Application Data

(62) Division of application No. 12/467,816, filed on May 18, 2009.

(60) Provisional application No. 61/054,001, filed on May 16, 2008.

(51) Int. Cl.
*G06Q 30/06* (2012.01)
*G06Q 10/08* (2012.01)
*G06Q 20/20* (2012.01)
*G07F 7/00* (2006.01)

(52) U.S. Cl.
CPC ......... *G06Q 30/0603* (2013.01); *G06Q 10/08* (2013.01); *G06Q 20/204* (2013.01); *G06Q 20/208* (2013.01); *G06Q 30/0601* (2013.01); *G06Q 30/0643* (2013.01); *G07F 7/00* (2013.01)

(58) Field of Classification Search
CPC .... G06Q 20/204; G06Q 20/20; G06Q 20/322; G06Q 20/202; G06Q 20/3278
USPC .......................................................... 705/17
See application file for complete search history.

(56) References Cited

U.S. PATENT DOCUMENTS

| 2002/0035537 A1* | 3/2002 | Waller et al. .................... 705/37 |
| 2003/0171944 A1* | 9/2003 | Fine et al. ......................... 705/1 |
| 2007/0005377 A1* | 1/2007 | Cherry .............................. 705/1 |
| 2007/0187183 A1* | 8/2007 | Saigh et al. ..................... 186/53 |

OTHER PUBLICATIONS

Robinson, Pamela. Are UK supermarkets socially responsible? : A case study analysis of labour codes of conduct in a global banana supply chain. Cardiff University (United Kingdom), ProQuest Dissertations Publishing, 2008.*

* cited by examiner

*Primary Examiner* — Ryan Zeender
*Assistant Examiner* — Fawaad Haider
(74) *Attorney, Agent, or Firm* — Lewis Rice LLC

(57) ABSTRACT

A system and method for virtual markets with product pickup generally comprised of a three-dimensional user supermarket interface, where a user places an order, and a retail/warehouse hybrid procurement center, comprised of a fulfillment warehouse and a pickup bay, where the order is generally fulfilled, packaged and picked-up by a user.

4 Claims, 6 Drawing Sheets

SYSTEMS AND METHODS FOR VIRTUAL MARKETS WITH PRODUCT PICKUP

CROSS REFERENCE TO RELATED APPLICATION(S)

This application is a Divisional of U.S. Utility patent application Ser. No. 12/467,816 filed May 18, 2009 which, in turn, claims benefit of U.S. Provisional Patent Application Ser. No. 61/054,001 filed May 16, 2008. The entire disclosure of both documents is herein incorporated by reference.

BACKGROUND

1. Field of the Invention

This invention relates to the field of systems and methods for virtual markets with fulfillment of orders via product pick-up.

2. Description of the Related Art

There is no longer any doubt that the Internet and the personal computer have transformed the consumer habits of the world we live in. In just a few short years, e-commerce has become a multi-billion dollar enterprise with companies such as Ebay™, Amazon™, Google™ and others leading the way. Whether it's buying books or booking tickets, more and more people worldwide are turning to web-based retailers to spend their money, forcing traditional brick and mortar retailers to reconsider their place in this new world—a world that won't wait and will soon leave their form of retail behind.

As illustrated in Table 1, Internet traffic is significantly increasing across the global spectrum. As the technology becomes more user friendly, developing and third-world nations become more technologically advanced, and cultural and societal norms adapt to societies where more and more of human networking, commercial activities and human communication occurs via Internet resources, this "online" audience of consumers will only continue to augment.

Worldwide Internet Audience (000)
January 2008 vs. January 2007
Total Worldwide, Age 15+ — Home and Work Locations*
Source: comScore World Metrix

| Region | Jan-07 | Jan-08 | Percent Change |
| --- | --- | --- | --- |
| Worldwide | 746,934 | 824,435 | 10.4% |
| Asia Pacific | 271,192 | 308,817 | 13.9% |
| Europe | 218,063 | 232,866 | 6.8% |
| North America | 173,839 | 183,823 | 5.7% |
| Latin America | 50,641 | 59,025 | 16.6% |
| Middle East-Africa | 33,199 | 39,904 | 20.2% |

*Excludes traffic from public computers such as Internet cafes or access from mobile phones or PDAs.
comScore Networks, Inc., Mar. 18, 2008, Digital World: State of the Internet As Internet traffic grows, it is expected that, so too, will the number of consumers who click their way to purchases, as opposed to purchasing goods from the traditional brick and mortar retail outlet. As the consumer begins to turn to the Internet as the preferred modality for engaging in commerce, it is expected that advertising focus and income will also turn away from traditional shopping retail centers.

Engaging in commerce in an online forum has numerous advantages over the traditional brick and mortar retail environment, including but not limited to: accessibility, ease of use, selection of products, better pricing, and, importantly, the reduced amount of time it takes to complete a transaction (according to the Pew Research Center, 68% of middle class Americans report that "having enough free time to do the things you want" is their highest priority—higher even than being wealthy (12%); Pew Research Center—*Inside the Middle Class: Bad Times Hit the Good Life*, Apr. 9, 2008).

One retail sector in which there is large potential for Internet commerce growth is grocery stores. During the "dot com" boom of the 1990s, online groceries joined the rush to the web. However, characteristic of the dotcom bubble as a whole, these online groceries were faced with unconstrained spending, overwhelming start-up costs, the prohibitive funds needed to create and purchase web content, and the impediment of developing effective distribution systems. In the end, by the time all the costs were counted, a can of Campbell'S™ soup cost more to purchase online than it would at the traditional grocery retail market. It also proved difficult for the Internet grocery start-up to build enough awareness and trust, fast-enough, to allow the model to flourish. The resultant slower than expected consumer adoption of buying groceries over the Internet resulted in the early online grocery market pioneers being acquired or closed down during the dotcom bust. For example, Safeway™ acquired GroceryWorks™, Ahold USA™ acquired Peapod™ and Streamline™, and Shoplink™ and Webvan™ closed down.

In the wake of the dotcom bust, existing companies in the grocery retail market began to make moves to fill the void, capitalizing on existing corporate resources, brand power and existing customer bases, to create a web-based, demand driven supply network that would work for online grocery ordering and delivery.

Both currently utilized and now defunct online grocery store business models can generally be categorized into one of three main groups: a) models that implement order fulfillment from retail stores and warehouses with delivery; b) models that utilize consumer pick-up from retail stores; and c) models that offer secondary grocery store services.

Order Fulfillment and Delivery Models

The order fulfillment model is simply a model of online ordering and subsequent delivery. In some instances, order fulfillment occurs at a warehouse location. In other instances, order fulfillment occurs at the traditional brick and mortar retail store. Whether fulfillment occurs at a warehouse or the traditional retail store, each model requires employee fulfillment of the orders, which can be labor intensive. Further, the cost of delivery must be factored into each online purchase and passed onto the customer. To accommodate these additional costs, generally, these models charge an additional overhead fee for the packaging and delivery service they provide. Grocery retailers that currently offer such online services include Safeway™, Amazon Fresh™, Net Grocer™ and Peapod™, among others. Further examples of such remote order fulfillment and delivery models include Waller, et al., U.S. Patent Application US 2008/0029595 and Razumov, U.S. Pat. No. 7,024,378 B2.

Pick-Up from Stores

Another business model that several brick-and-click grocers offer is pickup from retail stores. In this model, again, the grocery ordering is done remotely by the consumer online. Then, the groceries are packaged and available for pick-up by the consumer at a convenient retail location. As with the order fulfillment and delivery model, there is generally an additional overhead fee associated with this service. Existing retailers that offer such a service include Krogers™ and Alberston'S™, among others. Further examples of such pick-up from retail store models include Bared, U.S. Patent Application, US 2003/0177072 A1.

Secondary Grocery Store Services

This model does not offer remote purchase of groceries, but rather offers secondary services to increase consumer loyalty to pre-existing brick and mortar grocery store retailers. For example, these websites offer information on exclusive in-store specials, coupons, prescription refills, and a tool that can be utilized by the consumer to build a shopping list to assist with in-store shopping. Importantly, outside of offering services to track down hard to find grocery items or ordering specialty platters, no grocery services exist on these sites. Existing retailers that offer such services include Giant Eagle™, H.E.B.™ and Winn-Dixie™.

Common to all the aforementioned currently utilized online grocery store business models is a two-dimensional display interface with which the consumer interacts to place their order. These two-dimensional interfaces utilize a search and find modality for a user to access certain grocery goods on the site. For example, an individual who wants to purchase breakfast cereal would type "cereal" into the search box and hit search. The consumer would then be provided with a scroll down menu of all the available cereal options. However, such a long, scrolling, text-based list of items can act as an impediment to customer satisfaction for consumers who want to be able to access the facts about the items they are buying; visualize the item; assess the item's shape or color; or evaluate its nutritional content.

Each of the forgoing online grocery store models has numerous problems associated with it. First, additional cost. In order to compensate for larger overhead costs, both the fulfillment and delivery and pick-up models add an additional service fee cost onto the base cost of the grocery goods purchased. This overhead cost dissuades many shoppers who view the cost, week after week, as not reasonable in exchange for the benefit of the convenience gained.

Second, delivery complexity. Delivery becomes challenging and expensive because of the varied temperature control needed in the delivery trucks and vans. Further, the items to be delivered are often bulky and heavy. This high volume to value ratio generally increases the relative cost of delivery since more trucks and drivers are needed to transport orders. In addition, delivery preparation can be timely and delivery itself can be unreliable. Further, many individuals do not want grocery deliveries being "dropped off" at their home, even if in exchange some amount of leisure time is added to their day. This sentiment is particularly powerful for consumers who do not want groceries dropped off at their home while they are not there. The resultant dance of timing an individual's arrival home with that of the grocery delivery truck can be more of a hassle than the actual convenience of the delivery of the goods in the first instance. For example, few individuals like to be forced to stay at home, waiting for a cable worker or the UPS™ delivery man.

Third, sensory issues. Product quality is often difficult to evaluate online, especially for non-packaged goods such as produce and bread. These items generally fall into the category of "touch and feel" items that customers generally prefer to inspect and have a tactile interaction with before purchasing. Fewer sensory cues are available online than in the physical stores where individuals can often smell or touch fruit to assess whether it is fresh and ripe.

Fourth, temperature issues. Many grocery products are temperature sensitive. Refrigerated and frozen items can spoil easily unless the temperature is controlled. This temperature control issue becomes a problem in delivery oriented services where the temperature of some, but not necessarily all, of the items to be delivered must be controlled. Further, this becomes an issue when the order is simply "dropped off" at a location when an individual is not at home.

Fifth, the technology impediment. As noted previously, the technology interface used by the majority of current online grocery retailers is a two-dimensional search and find interface that presents a user with a scroll down list of applicable items. This experience is generally far removed from that of the consumer in a traditional brick and mortar grocery store, where they have visualization of a number of different cereals available in one view on one shelf (no scrolling down a list or additional searches are needed) and where the consumer has quick access to the item to visually explore its different features from different angles. This drastic change in the user experience of purchasing groceries, coupled with a misunderstanding and lack of comfort with search and find functions, dissuades many older adults (a large percentage of the grocery retail market) from the online grocery forum.

Sixth, the lack of ability to browse. While a large percentage of the groceries purchased by individuals and families are the same from week to week, a certain percentage of most grocery store trips involve some degree of browsing. For example, if a consumer is looking for a new item for a recipe or a new snack food or cookie. In the two-dimensional user interface format of current online grocery models, this type of browsing is not available.

Seventh, high operating costs. For the "pick and pull" business models, a key issue is the added cost and complexity that results from mixing online retailers with traditional brick and mortar grocery store shoppers. In order to efficiently pull and package online orders, these retailers need to employ extra individuals in order not to forsake customer service and efficiency for their traditional shoppers. Further, these stores need to maintain the traditional retail shopping aesthetics of displays and store layouts for the traditional shopper. Also, the trolley rage which occurs from stress in crowded supermarkets, where regular shoppers get annoyed when employees picking online orders cause congestions and consumers picking-up online orders clog check-out lanes, can cause customer dissatisfaction for both traditional and online consumers.

Thus, despite its widely perceived potential at the time and numerous benefits and convenience, the problems associated with the online grocery market have maintained the status quo of individuals obtaining the majority of their groceries from traditional brick and mortar retail venues. The online grocery market has not realized the potential that was forecast for it.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein are, among other things, an Internet-based grocery retail store system comprising a computer network with at least a first and second computer; an Internet-based three-dimensional virtual supermarket interface a user can access from a first computer, configured for a user to order and purchase retail goods; a second computer on a computer network receiving an order of a user placed on the Internet-based three-dimensional virtual supermarket interface, the second computer being located in a retail/warehouse hybrid procurement center, the retail/warehouse hybrid procurement center being comprised of a fulfillment warehouse and a pick-up bay; means for packaging the order at the fulfillment warehouse to create a packaged order; and means for transferring the packaged order to the vehicle of said user at the pick-up bay.

In one embodiment of the Internet-based grocery retail system, the three-dimensional virtual supermarket interface is a three-dimensional image of a traditional retail supermarket.

In another embodiment of the Internet-based grocery retail system, a user can obtain a plurality of views of a chosen retail product.

In yet another embodiment of the Internet-based grocery retail system, a three-dimensional virtual supermarket interface is coupled with a help desk with real time chat.

In still another embodiment of the Internet-based grocery retail system, the three-dimensional virtual supermarket interface contains a private aisle. In yet another embodiment, the private aisle contains personalized information on a variety of the user's retail preferences or, in another embodiment, contains a just for you section.

In one embodiment of the Internet-based grocery retail system, a user will be able to order grocery pax on a three-dimensional virtual supermarket interface.

In yet another embodiment, the three-dimensional virtual supermarket interface is used in conjunction with a product scanner to categorize and store information regarding products used by the user in the home on the three-dimensional virtual supermarket interface.

In another embodiment of the Internet-based grocery retail system, the pick-up bay is comprised of at least two storage facilities, one of the storage facilities being temperature controlled for storage of perishable items, one of the storage facilities not being temperature controlled for non-perishable items.

In one embodiment of the Internet-based grocery retail system, the pick-up bay is comprised of at least one checkout bay. In another embodiment of the system, this checkout bay is comprised of an indicating system. In yet another, this checkout bay will be outfitted with gas pumps.

In another embodiment of the Internet-based grocery retail system, the pick-up bay is comprised of a computer system to efficiently manage customer pick-up. Similarly, in another embodiment, a user will swipe an identifying card in the pick-up bay to transfer the packaged order to the pick-up bay.

In yet another embodiment of the Internet-based grocery retail system, a separate area of the retail/warehouse hybrid procurement center will be designated a small retail areas space designed for customer service.

Further, also disclosed herein is a method for providing an Internet-based grocery ordering and pick-up, comprising the following steps: providing an Internet-based three-dimensional virtual supermarket interface accessible to users by the Internet through which the users can browse, search, and manipulate grocery store items in a plurality of views for purchase and order; processing user grocery store orders placed on the Internet-based three-dimensional virtual supermarket interface by transmitting the order to a retail/warehouse hybrid procurement center designated by the user at the time of the order where grocery orders are fulfilled in a fulfillment warehouse; delivering the orders to a pick-up bay where the orders are picked up by the user at a checkout bay; and loading the order into the user's vehicle after the user has confirmed payment for the order.

In another embodiment of the method for providing an Internet-based grocery ordering and pick-up, the method further comprises the step of storing and categorizing information regarding products used by a user in the home by scanning the information of used products with a product scanner and transmitting the scanned information to the three-dimensional virtual supermarket interface.

DESCRIPTION OF THE PREFERRED EMBODIMENT(S)

Figure 1:
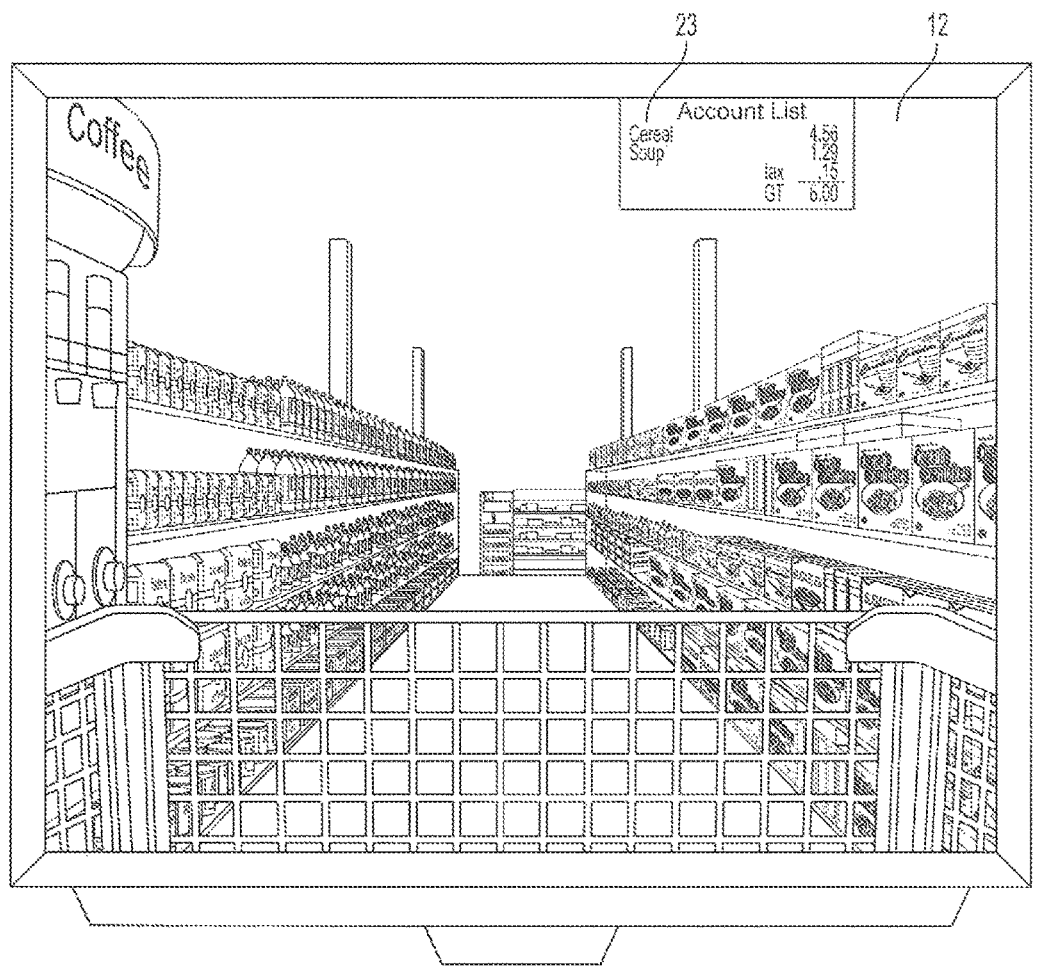
FIG. 1 provides a perspective view of an embodiment of the three-dimensional virtual supermarket interface.

The following detailed description illustrates by way of example and not by way of limitation. Described herein, among other things, is a new model of shopping, specifically for shopping for groceries or other essentially "commodity goods" that connects the personal computer to a more traditional brick and mortar pickup location, thus merging a more traditional shopping experience with the efficiencies of electronic shopping.

Prior to explaining the details of specific embodiments, it is helpful to develop a general perspective of the scope and the various elements and methods which may be used to implement the present invention. This disclosure will focus on the purchase of food and the interaction of the disclosed system in a supermarket environment; however, one of ordinary skill in the art would understand how to adapt the systems, methods, and devices discussed herein to be used in other retail purchasing or commercial environments.

Further, this disclosure will focus on the concept of a "supermarket," as that is by far the most common type of food market used today. As used in this disclosure, the term "supermarket" means a self-service store offering a wide variety of food and household merchandise, organized into departments. The merchandise offered typically comprises meat, fresh produce, dairy, and baked goods, along with canned and packaged goods, household cleaners, pharmacy products, and pet supplies. In sum, a "supermarket" is defined as a store that sells a variety of household products that are consumed regularly, such as food products, alcohol (where permitted), household cleaning products, and medicine. However, use of this term in this disclosure is merely to create an exemplary embodiment. It is to be understood that the systems, methods and devices disclosed herein may be applied and used in any type of market, commercial environment (such as a restaurant), and/or retail environment. As such, the disclosure herein will utilize the traditional "big box" supermarket as a stereotypical example of a retail food purchasing experience, primarily utilizing it discuss how the systems, methods, and devices herein will both maintain the traditional retail shopping experience, as well as alter it. In no way, however, does this exemplary usage of the supermarket limit the invention of this disclosure to use or application in that environment.

As a preliminary matter, it is also important to note that the Internet-based retail store, system and method described herein utilize a computer network, with at least a first and second computer. Generally, the first computer is the computer upon which a user engages with the three-dimensional virtual supermarket interface disclosed herein to place an order on the Internet. Further, in one embodiment, it is through the computer network that the order is transferred to a second computer generally located at the retail/warehouse hybrid procurement center disclosed herein from which the order can be obtained for subsequent packaging (although, it is important to note that in some embodiments the order could first be transferred to a second computer located at a data processing, or similar facility, in at least one stop-over prior to transmission to the retail/warehouse hybrid procurement center). Generally, however, as the term is used throughout this disclosure, "computer network," means any network or computing system known now, or in the future, to those of skill in the art.

Before discussing the individual components of the system and method described herein, a brief overview of the system and method as a whole will be given. It should be noted that this "overview" of one embodiment of the system and method is in no way limiting, as it is contemplated that the component elements of the three-dimensional virtual supermarket interface and the retail/warehouse hybrid procurement center (comprised of the fulfillment warehouse and the pick-up bay) can be organized in multiple ways as would be understood to those of skill in the art to create a functioning and efficient system and method for a virtual market with product pick-up.

Figure 6:
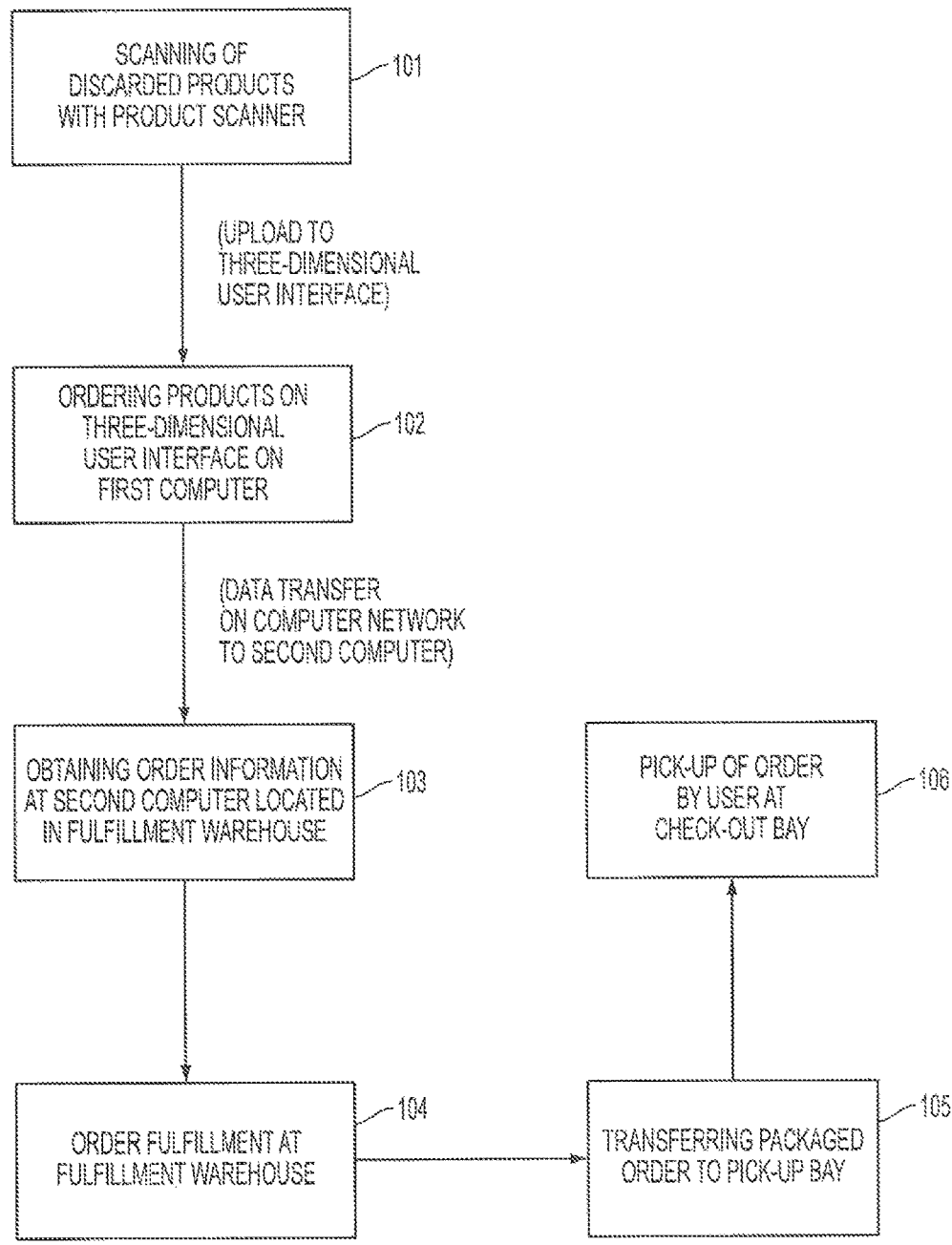
FIG. 6 provides a flowchart of the disclosed system from product order on the three-dimensional virtual supermarket interface to order pick-up at the retail/warehouse hybrid procurement center.

In one embodiment of the system and method of the present disclosure, as seen in the flow-chart of FIG. 6, a consumer will first, with a product scanner, scan the information of discarded products in their home (101). This scanned information will then be automatically uploaded to the three-dimensional supermarket interface. Then, at a first computer, the consumer will go "online" to the three-dimensional supermarket interface and order products (102). These may be scanned products and/or other products which the consumer selects in the interface. The consumer's order will then be transferred, on a computer network, to a second computer located in a fulfillment warehouse. The information about the order will then be obtained from the second computer located in the order fulfillment warehouse (103), and the order will be fulfilled at the warehouse (104). This may be through human employee product fulfillment, by robotic or semi automatic methods, or by any combination of these. Following fulfillment, the packaged order will be transferred to the pick-up bay (105) where it will await product pick-up. Once at the pick-up bay, the consumer can pick-up the order at the designated check-out bay (106) at a retail/warehouse hybrid procurement center which is designed to provide order fulfillment.

Generally, the system of the present claims can be broken into two main components: the shopping experience characterized in the three-dimensional virtual platform and the setup of the shopping list and order fulfillment characterized by the retail/warehouse hybrid procurement center. These components will first be discussed individually and then together as to how they function in the resultant system.

In an embodiment of the system, the online website with which a user/consumer interfaces is a three-dimensional virtual workplace (12). As the term is used through out this disclosure, a three-dimensional workspace (12) is defined as a workspace that is perceived by the user as extending in three orthogonal directions. It is a two-dimensional display surface that creates the illusion or perception of a third dimension by visual cues (e.g., perspective lines extending toward a vanishing point). The three-dimensional effect can also be achieved by obscuring distant objects by nearer objects; showing change in objects as they move away or towards the users in the workplace; perspective shading of the objects corresponding to different distances; and any other method known now, or in the future, by those skilled in the art to create a three-dimension user interface.

It is important to note that within the three-dimensional virtual workspace (12) of the present disclosure, a user can move around or navigate within the three-dimensional environment (12), altering his or her perspective of the displayed representation of the data as said movement occurs. This change in the view of the display space gives the user the sensation of moving within the three-dimensional graphical space (12) while, in fact, the user is actually in a stationary position at his or her computer. Thus, when, in this disclosure, the user's perceived motion is discussed, in reality, this refers to changes in the user's view of the three-dimensional graphical space interface (12).

As seen in FIG. 1, the three-dimensional workspace (12) of the present embodiment is generally a three-dimensional image/counterpart/replica of the traditional brick and mortar supermarket. Thus, a user is presented with the three-dimensional image of racks of shelves, a bakery with stacks of bread, a deli with the selection of meats in a case, the refrigerator section with rows of milk, along with other displays and arrangements of food and merchandise commonly found in the brick and mortar supermarket environment. All of these product items on the shelves are contemplated, as in a traditional supermarket environment, from the user's point of view. It is contemplated in this disclosure that a user will be able to utilize three-dimensional workspace navigation techniques known to those of skill in the art now, or in the future, to navigate the virtual workspace (12). For example, in one embodiment, movement of the user within the three-dimensional workspace (12) is controlled by a computer mouse.

In an application, one embodiment of the three-dimensional interface (12) will function as follows. Using navigational techniques known to those of skill in the art, a user will be able to move up and down the aisles and throughout the virtual supermarket three-dimensional interface (12) as in a traditional store. It is also contemplated that a user will be able to view the three-dimensional supermarket interface (12) from a simple and artful "birds-eye" view from which they can zoom into a closer "floor level" view by clicking on a particular aisle of interest. In another embodiment, a user can maneuver through the three-dimensional supermarket interface (12) by "pushing" a cart, akin to the traditional supermarket experience. While these forms of navigation are specifically enumerated in this disclosure, it is important to note that any form of navigating a three-dimensional supermarket interface known by those of skill in the art now, or in the future, is contemplated in this disclosure. No matter what navigating tool or feature is used, as the user moves through the three-dimensional supermarket interface (12), the items within the user's view will be transformed.

Again utilizing the example of cereal, navigation in an embodiment of the three-dimensional supermarket interface

(12) will be described. A user navigating down the cereal aisle of the three-dimensional virtual supermarket (12) would receive the sensation of walking down the cereal aisle in their neighborhood supermarket. As the user progressed down the aisle, the different cereal brands and types stored on the shelves would come into clearer view. Akin to the traditional shopping environment, as the user is "walking" down the cereal aisle, the visualization provided by the three-dimensional environment (12) allows the user to browse the shelves of cereal products. If the user becomes more interested in a particular brand of cornflakes, the user would select the particular brand with a mouse or other selection modality known to those of skill in the art used in three-dimensional environments. It should be noted that, throughout the present disclosure, the term "mouse," as it is used herein, shall mean any selection modality known to those of skill in the art.

Figure 2C:
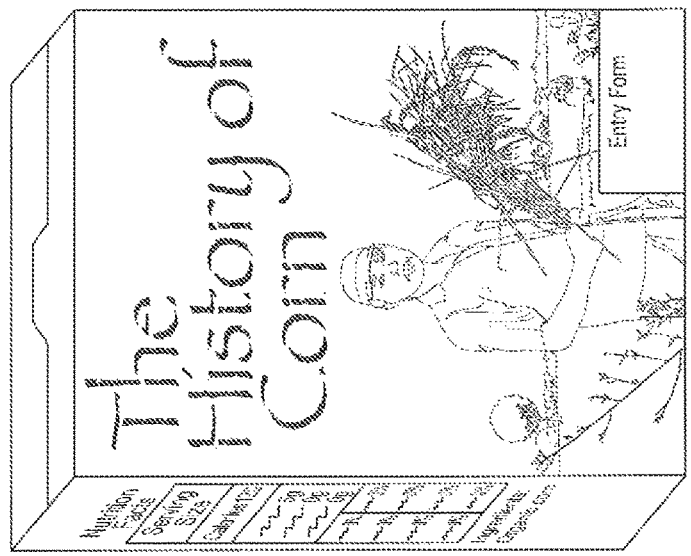
FIGS. 2a, 2b, and 2c provide a perspective view of a plurality of product viewpoints/perspectives available to a user on the three-dimensional virtual supermarket interface.
Figure 2B:
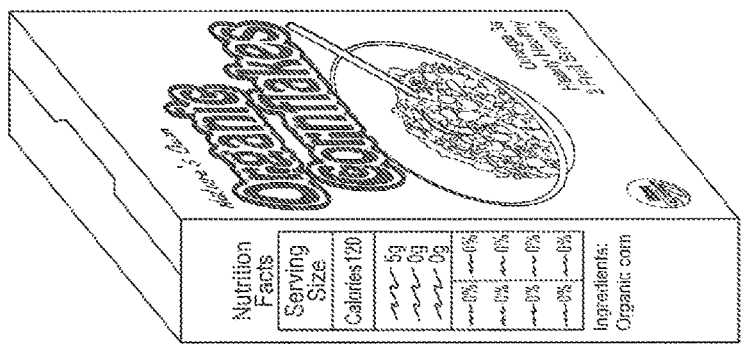
Figure 2A:
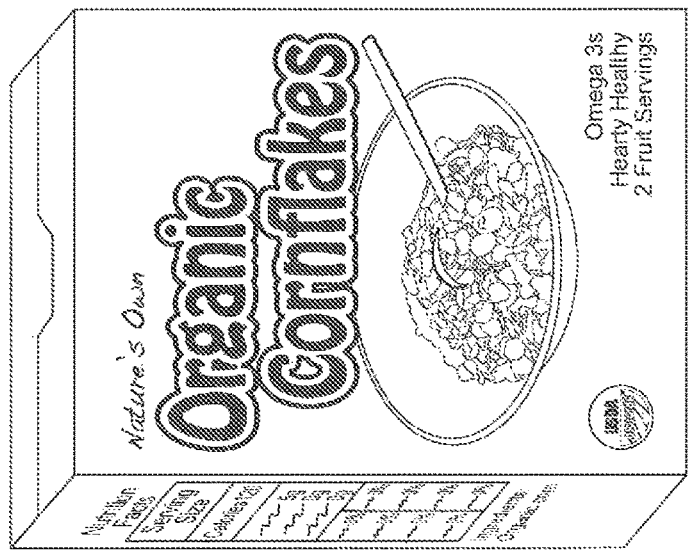

Once selected, the user will be presented with a close-up face view of the chosen cereal product as seen in FIG. 2a; the same view a user would get in a supermarket who took a product off the shelf to get a closer look. Then, through movement of the mouse, the user can change the view of the product to see the side view, as seen FIG. 2b, (to find out nutritional information about the cereal product), rear view, as seen in FIG. 2c, (to look at games, prizes, and special offers) or any other view that interests the user. If the user then chooses to purchase the cereal, it can be placed in their virtual "cart"

In addition to a plurality of views, in one embodiment, once a product is selected a user will be notified of the retail price of the item or if that particular item is on sale. Once placed in the "cart" for purchase, the price of the given item will be added to an account list (23) located conveniently in the three-dimensional virtual supermarket interface (12). This account list (23) totals the purchase price of items selected and placed within the cart, giving the user a tool to encourage and keep in check effective budget restraints.

This visualization and subsequent placement of the product gives the user a visualization of the product itself, and the product in relation to what they have already placed in their cart. Thus, this three-dimensional interface (12) satisfies a user's tactile desire to see a product prior to purchase and the user's desire to visualize their grocery purchase as a whole and to ensure they do not purchase more than their car, cabinets or fridge can carry and hold.

In addition to placement in a "cart" for purchase, it should be noted that a user, through the mouse selection process used to place the product in the cart, can also remove a product they no longer desire after it has been placed in their cart. Once removed, the price of the given item will be subtracted from the account list (23). Again, this ability to add and remove products from a "cart" is an experience akin to what a user is used to in their traditional shopping environment.

In one embodiment of the three-dimensional virtual supermarket interface (12), the three-dimensional supermarket environment (12) will be coupled with a help desk with real time chat (16). This addition provides a user with the same, or better, customer service than the user would receive from employees at their local brick and mortar retail store. For example, if a user wanted to special order an exotic spice for an ethnic recipe, the user could go to the help desk (16) and "chat" (via video and audio, typing, or other modalities for communicating over the Internet known to those of skill in the art) with a customer service agent at a remote location to place a special order.

In another embodiment of the three-dimensional supermarket interface (12), a user's own "Private Aisle" (21) will be created. This area, aisle or other designated space of the user's three-dimensional virtual supermarket (12) will contain personalized information on a variety of the user's retail and shopping preferences. For example, in one embodiment, a user's Private Aisle (21) will contain the user's shopping history over time, specific shopping lists developed by the user, and filters for food restrictions or preferences, among others. In yet another embodiment of the Private Aisle (21), it is contemplated that a link to items suggested by the store based on previous purchases and a current list of any promotional discounts a customer may be accruing, along with other customer loyalty, incentive, promotional and advertising tools/benefits known to those of skill in the art, will be provided.

In another embodiment, the Private Aisle (21) will also be the place where the customer will check-out with their order. In one embodiment, to ease the check-out process, a user can utilize a financial transfer instrument such as, but not limited to, a credit or debit card, and put it on file with the three-dimensional virtual supermarket interface (12) for easy and simplified checkout. As in the traditional brick and mortar supermarket retailer, applicable coupons and discounts will be deducted at the time of purchase. However, unlike the traditional retail store environment, there will be no need to input coupons, as in one embodiment any manufacture coupons which are available at the time of purchase will be automatically deducted from a user's final order at the time of checkout.

In another embodiment, a user will be able to order "Grocery Pax" (56) from the online grocery website described in this disclosure. As the term is used in this disclosure, "Grocery Pax" (56) means packages of uncooked ingredients conveniently assembled in such a manner suitable for user use and consumption. In one embodiment, the "Grocery Pax" (56) will be food packages assembled to be conveniently utilized at special events, such as birthdays, barbeques and family get-togethers. For example, contemplated special event "Grocery Pax" (56) include food packages with all of the necessary ingredients for a chip-dip appetizer for a special event or a package with all the necessary ingredients for a large sheet cake for a birthday. A user would simply have to choose the event, dish or dishes desired, and the number of attendees and a correctly sized "Grocery Pax" (56) would be assembled. In another embodiment of the "Grocery Pax," (56) fully cooked fresh meals, which only require at-home reheating, would be available for order and/or purchase. In yet another embodiment of the "Grocery Pax" (56), the package would include all of the necessary ingredients, in the necessary portion size, for a recipe chosen by the user. For example, if a user wanted to make lasagna, the lasagna "Grocery Pax" containing noodles, sauce, ricotta cheese, among the other required ingredients—allocated in the correct proportions—could be ordered.

In an alternative embodiment, the virtual three-dimensional supermarket (12) and Private Aisle (21) are used in conjunction with a product scanner (42). As a preliminary matter, it is noted that the term "product scanner," as it is used in this disclosure, means any technology know to those of skill in the art that is capable of scanning a bar code, universal product code (UPC) or other identifying mark on a product used by a user and potentially purchased on the grocery website of the present disclosure. While wireless scanners are preferred, the term also encompasses scanners with wires. In sum, the term encompasses any scanning technology that a user can utilize to categorize, note and store information regarding products used in the home. In this embodiment, the product scanner will generally be located in a convenient location for a user to scan products as they are used and finished. For example, near the trash can of the user's home kitchen. In this position, a user can "swipe" the bar code of a supermarket item prior to disposal of the empty container. At a later time, when the user sits at their computer and logs into the three-dimensional virtual supermarket interface (12) disclosed in this application to "go shopping," the three-dimensional virtual supermarket interface (12) will be able to retrieve the scanned information (through a wireless connection if the scanner is truly wireless) and upload the list of items to the three-dimensional supermarket interface (12).

In one embodiment of the disclosed system, this user personalized scanned list will be incorporated into a shopping list on the user's Private Aisle (21). For example, if someone buys the same items every week for their family, by using the bar code scanner information, the shopping list will reflect if they bought six cans of soup last week and only used four. The user can then adjust their purchases accordingly. In this way, it is contemplated that the product scanner (42) of the present embodiment has the ability to act as an inventory control tool, which has the ability to automatically update and modify a user's shopping list based on user usage and need. With the basic list already calculated and compiled through this interaction between the product scanner (42) and the Private Aisle (21), a user will have more time to browse the three-dimensional virtual supermarket (12) for specialty items outside of their rote weekly purchases. An additional benefit to this tool is the ability it provides a user to see how they and their family are eating over the course of the year with food items broken down into categories. This aspect of this tool has obvious benefits both from a budgetary and nutritional standpoint.

In yet another embodiment of the Private Aisle (21), there may be a section called, "Just for You" (73). This feature will be a list of items suggested by the store based on a user's past purchases; i.e., "You bought item X—can we suggest item Y as well?" In one embodiment of this feature, the "Just for You" (73) section will not be for store promotional items, but only those items specific to a given user; a specification that is determined by a user's past purchase history. In another embodiment of this feature, separate store promotions, outside of the "Just for You" (73) section, will be a separate link within the Private Aisle (21).

Taken together, the "Private Aisle" (21), product scanner (42) and "Just for You" (73) functions and features of the contemplated three-dimensional virtual supermarket (12) allow a user to shop in a variety of ways tailored to their particular habits and tastes. For example, with these functions and features a user can enter the item they are searching for or choose a repeat shopping list which, as noted previously, can automatically adjust based on an individual or family's current usage. In addition, the user can review store suggested items, or the user can visually maneuver the three-dimensional virtual supermarket environment (12) by wandering up and down the "aisles." It is important to note that it is contemplated in this disclosure that any of these actions may be easily performed alone or in combination in the disclosed three-dimensional virtual supermarket (12).

Generally, the second main component of the system of the present disclosure is the retail/warehouse hybrid procurement center (4); the manner in which customers obtain their groceries once an order is placed. Thus, not only is the manner in which a consumer purchases product on the Internet altered, as discussed above, but the manner in which customers obtain those groceries once they place their order is also altered in the system and method of the present disclosure.

As a preliminary matter, it is important to note that, as the term is used in this disclosure, a "retail/warehouse hybrid procurement center" is not a retail store or a warehouse. Rather, it is a hybrid somewhere between a retail store and warehouse. As such, it has some qualities of a warehouse and some qualities of a retail store.

As to the retail store qualities, the retail/warehouse hybrid procurement center (4) is similar to a traditional retail store generally only in its exterior façade and location. For example, it is generally contemplated that the retail/warehouse hybrid procurement center (4) will be located in an easily accessed and commonly known retail location, such as the retail strip mall that is the common location of most big box stores. Thus, it is contemplated that the retail/warehouse hybrid procurement center (4) will be generally located in retail zones amongst or near traditional brick and mortar retail venues.

Further, it is contemplated that the fulfillment warehouse (6) of the retail/warehouse hybrid procurement center (4) (which will be discussed further later in this disclosure) will have the exterior façade of a traditional brick and mortar retail venue. For example, in one embodiment, the exterior façade of the fulfillment warehouse (6) of the retail/warehouse hybrid procurement center (4) will be a store in a traditional big box retail strip mall. As such, it will have the exterior signage and other aesthetic marketing tools generally associated with traditional retail venues. However, generally these retail store qualities are only present on the exterior of the retail/warehouse hybrid procurement center (4).

As to the warehouse qualities of the retail/warehouse procurement center (4), as will be discussed further later in this disclosure, the interior of the fulfillment warehouse (6) of the hybrid retail/warehouse procurement center (4) is generally structured as a warehouse, with no retail qualities associated therewith.

Figure 3:
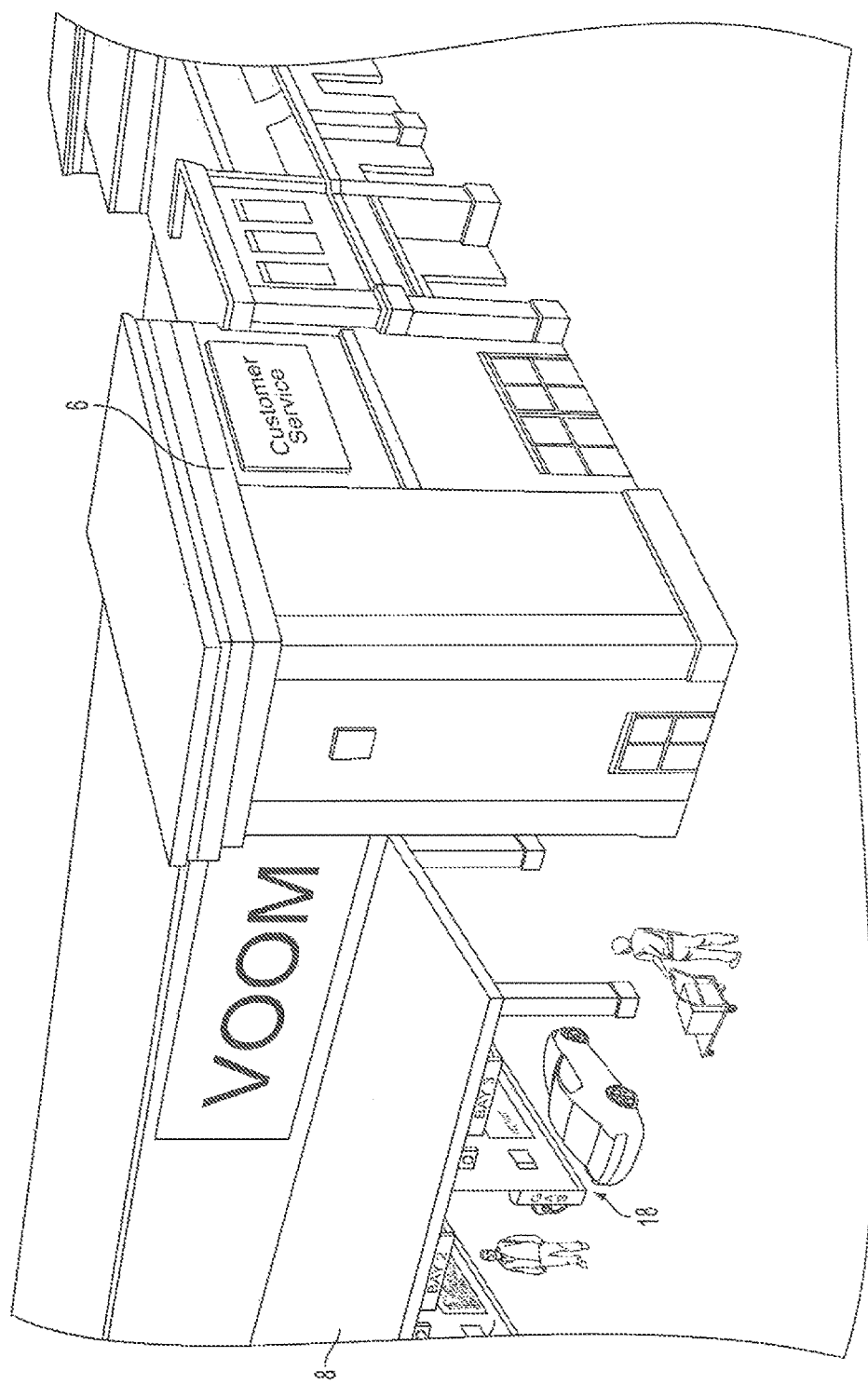
FIG. 3 provides a perspective view of an embodiment of the retail/warehouse hybrid procurement center.

Simplified, the retail/warehouse hybrid procurement center (4) can generally be divided into two main parts: the fulfillment warehouse (6) and the pick-up bay (8). One embodiment of the retail/warehouse hybrid procurement center (4), comprised of these two component parts, is displayed in FIG. 3. The fulfillment warehouse (6) will first be discussed, followed by a discussion of the pick-up bay (8).

Figure 4:
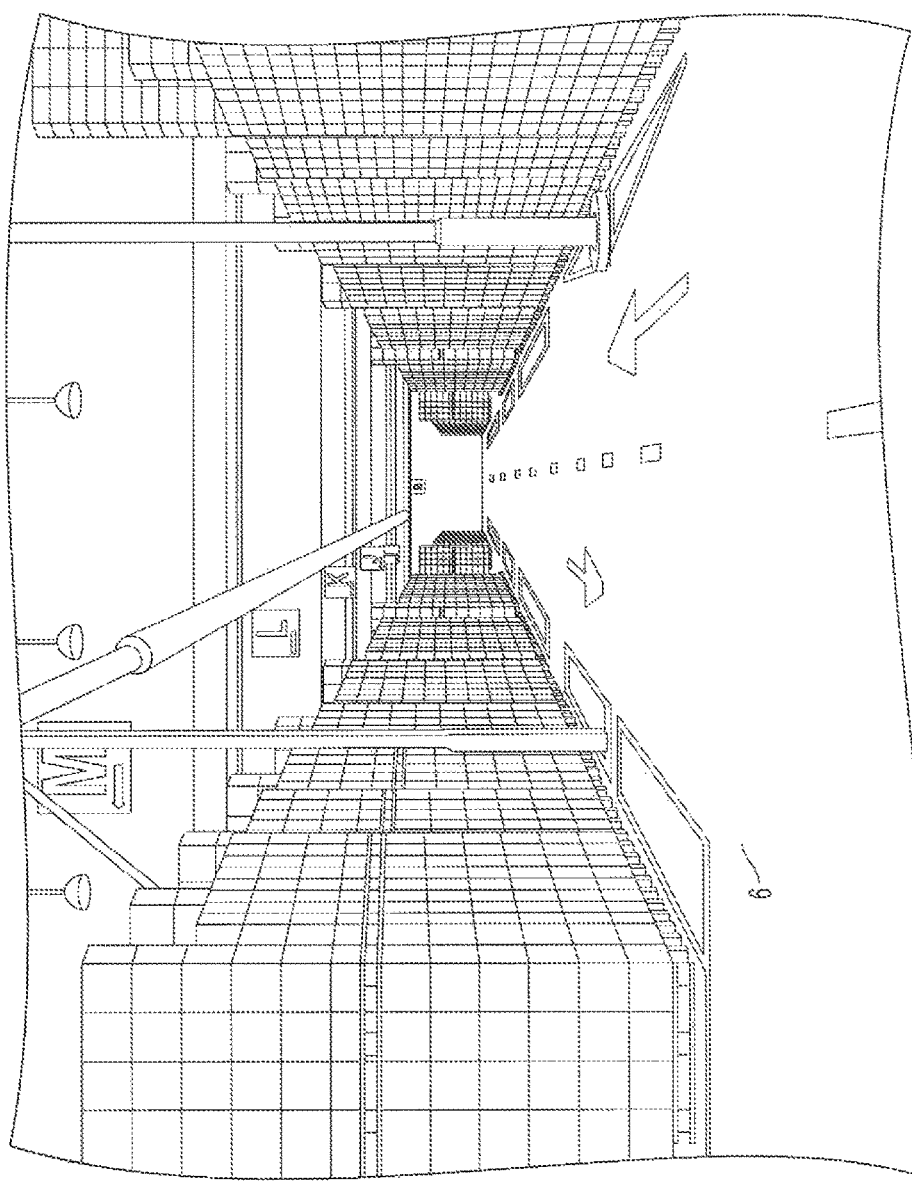
FIG. 4 provides a perspective view of an embodiment of a fulfillment warehouse.

As noted previously, the fulfillment warehouse (6) is generally not a retail store. As such, the interior structure of the fulfillment warehouse (6) is that of a warehouse; i.e., a commercial building for the storage of goods. As such, the fulfillment warehouse (6), as depicted in FIG. 4, is generally a cavernous industrial building, such as those known to those of skill in the art, for the storage and packaging of food or other commodities. Any structure known to those of skill in the art that satisfies this general storage and fulfillment purpose is contemplated in this disclosure.

Also similar to a warehouse, in one embodiment, it is contemplated that the fulfillment warehouse (6) is equipped with loading docks to load and unload products from trucks or alternative transportation vehicles. In yet another embodiment, it is contemplated that the interior of the fulfillment warehouse (6) contains cranes, forklifts, or similar equipment known to those of skill in the art for moving goods.

Outside of the interior structure, generally any type of warehouse storage system known to those of skill in the art is a contemplated interior organizational system of the fulfillment warehouse (6). Such systems include, but are not limited to, pallet rack systems (including selective, drive-in, drive-thru, double-deep, pushback, and gravity flow); mezzanine systems (including structural, roll formed, rack supported, and shelf supported); cantilever rack systems (including metal, steel, wire and catwalk); industrial shelving systems (including metal, wire and catwalk); and Automated Storage and Retrieval Systems (ASRS) (including vertical carousels, vertical lift modules, horizontal carousels, robotics, mini loads, and compact 3D). In any of the aforementioned warehouse storage systems employed in the fulfillment warehouse (6), it is contemplated that goods can be stored horizontally, vertically (to create a smaller effective footprint and utilize space efficiently), or in any other fashion known to those of skill in the art to effectively and productively store goods and products.

In function, the fulfillment warehouse (6) generally functions as a warehouse space in which automated technologies and/or personnel work to fulfill and package orders in an efficient and timely fashion. In one embodiment of the fulfillment warehouse (6), the warehouse is completely automated. In this embodiment, the pallets and product are generally moved with a system of automated conveyors and automated storage and retrieval machines coordinated by programmable logic controllers and computers running logistics automation software.

As to the storage of perishable items, in one embodiment the fulfillment warehouse (6) generally contains at least one large refrigerated storage section and at least one large freezer storage section. As the aesthetic concerns associated with the traditional brick and mortar retail environment are no longer a factor, it is contemplated that these refrigerated and freezer storage sections can be structured so as to maximize storage potential and energy efficiency. This, along with the general warehouse structure and organizational system of the fulfillment warehouse (6), results in a "store" with larger storage capabilities and better energy efficiency than the traditional brick and mortar retail environment.

In an alternative embodiment of the fulfillment warehouse (6) of the present disclosure, it is contemplated that packaging structures/machines/systems known to those of skill in the art are located within the fulfillment warehouse (6), for the packaging of a user's order. Contemplated packaging structures/machines/systems include, but are not limited to, skin and vacuum packaging machines; closing, seaming and sealing machines; boxing and cartoning machines; conveying, accumulating and related machines; feeding, orienting, placing, and related machines; package filling and closing machines; form, fill, and seal machines; wrapping machines; and product identification machines (i.e., labeling and marketing machines for the identification of orders post-packaging). These packaging structures/systems/machines function in the disclosed system and method to "package" the order in a way convenient for user pick-up, transfer and storage. Further, it is contemplated that the perishable items of an order can be packaged separately from (and with some cooling means known to those of skill in the art) or together with non-perishable items of the same order.

Due to its interior "warehouse" nature, it is important to note that it is contemplated that generally no customer traffic will grace the floors of the fulfillment warehouse (6). As such, the general aesthetic "add-ons" of the basic retail environment (e.g., product displays, customer friendly lighting, etc.), and the costs associated therewith, are not necessary. In addition, since there is generally no consumer traffic in the fulfillment warehouse, accident, shoplifting and other consumer-oriented forms of insurance will no longer be needed (or can be significantly reduced), adding an additional cost savings to the system and method as a whole.

Generally, distribution of food to the fulfillment warehouse (6) will be comprised of any distribution method known to those of skill in the art for effectively and productively supplying food retail venues. For example, in one embodiment regional distribution centers will be responsible for supplying the various fulfillment warehouse (6) locations with pre-packaged foods. Items which are generally sold in a fresher format, e.g., meats, produce and bakery items, will be distributed to the fulfillment warehouse (6) already cut (that day), weighed and wrapped, unless specific locations want to keep these services in-house. Grocery Pax (56), meals to go, and other more "custom" goods will also be assembled at a given fulfillment warehouse (6).

In one embodiment, a user's ordering on the three-dimensional virtual supermarket interface (12) and the subsequent order assembly at the fulfillment warehouse (6) are linked in the following manner. After checkout in the three-dimensional virtual supermarket interface (12), a user will be informed how soon their order will be ready for pick-up at their procurement center (4). Alternatively, they can schedule a time for pickup from their local procurement center (4). If a user desires to pick-up their order from a procurement center (4) other than one located in their local vicinity, it is contemplated that any viable procurement center (4) may be chosen.

Next, in one embodiment, once processed in the three-dimensional virtual supermarket interface (12), a user's order will be transferred (via any data or order transferring method) to a data processing center, which will then forward the information onto the company inventory control system and, from there, onto the procurement center (4), where the order will be fulfilled.

In one embodiment, the order fulfillment process will occur at the fulfillment warehouse (6) in the following manner. First, once a user has "checked-out" from the three-dimensional virtual supermarket interface (12) and the user's order had been transferred (via any order/data transferring modality know now or in the future to those of skill in the art), the order information will then be relayed to the fulfillment warehouse (6). Then, either employed packers or applicable automated warehouse technology will compile and package up the orders in a timely and cost-effective manner.

In one embodiment, this packaging will be accomplished by packagers via a bar-coded print out list that directs the packer to the individual items for each order. Next, using bins, wireless scanners or any other applicable technology known to those of skill in the art, the packers will assemble the order. The scanners function as an aid/safety tool in this capacity, informing an employee if an item on the order list has been missed. In addition, they function as a tool that allows the online grocery retailer to track order fulfillment and inventory. Once packaged, the finished order will be transferred (via applicable and cost-effective methods known to those of skill in the art) to the pick-up bay (8).

In one embodiment, a packer will be able to complete at least four orders per hour (15 minutes per order) which would be 28 orders per 8-hour shift (minus one hour for lunch and breaks). The result would be an order fulfillment of at least 560 orders per shift by the 20 packers, or roughly 4,000 transactions per 40-hour work week. However, as previously noted, any efficient method of packing orders at the fulfillment warehouse (6) is contemplated in this disclosure.

Figure 5:
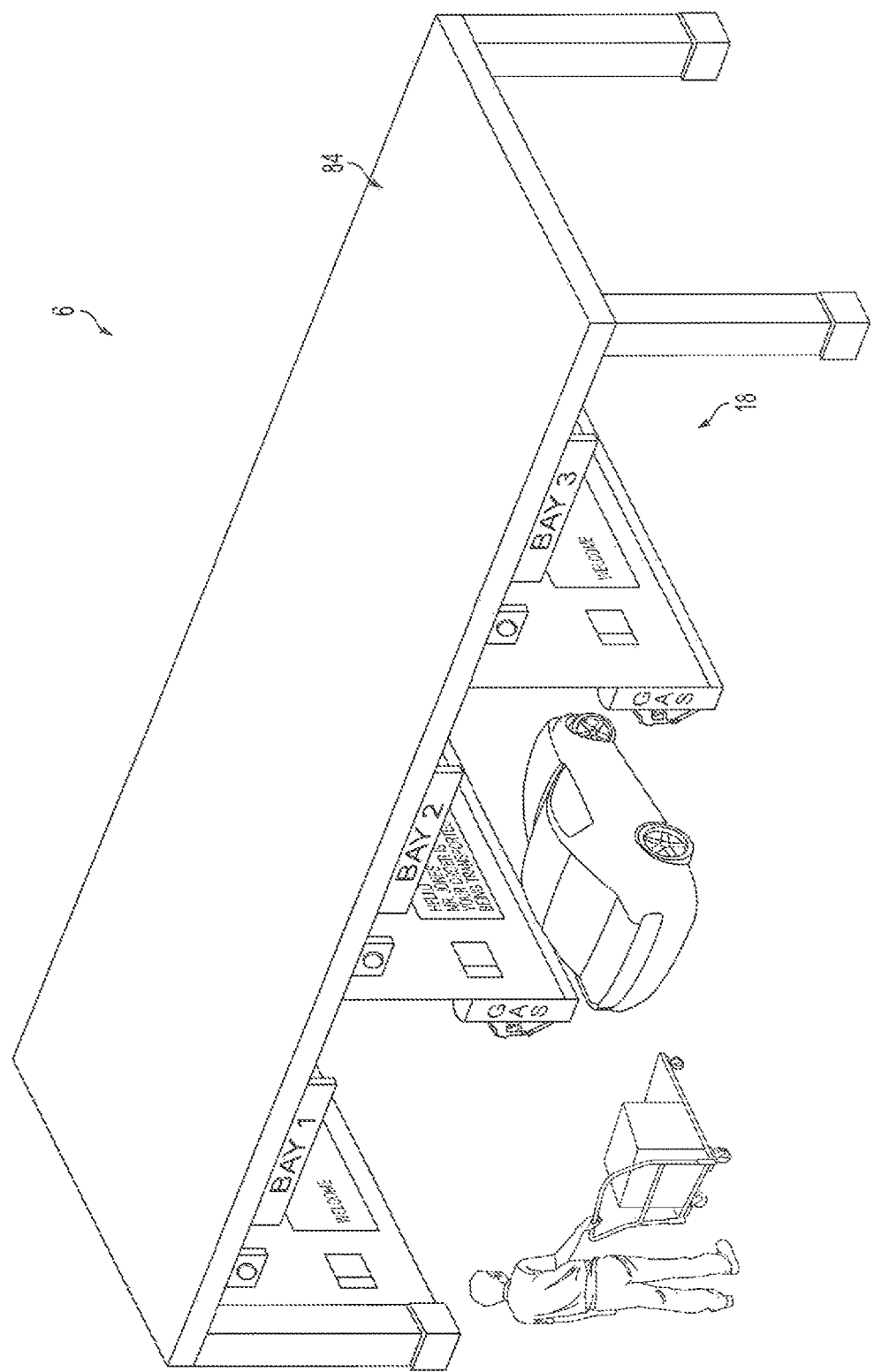
FIG. 5 provides a perspective view of an embodiment of a pick-up bay.

The second general component of the procurement center (4) is the pick-up bay (8). The pick-up bay (8), as seen in FIG. 5, is generally an outdoor "pick-up" structure located in a reasonably close proximity to the fulfillment warehouse (6) such that the transfer of packaged orders from the fulfillment warehouse (6) to the pick-up bay (8) is easy and efficient.

The structure of the pick-up bay (8) is such that it is generally an outdoor structure designed for the quick, easy and efficient distribution of packaged orders to users in their cars. As such, as depicted in FIG. 5, in one embodiment it is contemplated that the pick-up bay (8) will be comprised of several drive-thru lanes and associated booths generally referred to as check-out bays (18). Further, generally, the pick-up bay (8) will have two short-term storage facilities for orders awaiting pick-up: one temperature controlled storage facility for perishable items and another storage facility for canned or dry goods. In each storage facility, it is contemplated that the orders will be arranged in an organized fashion known to those of skill in the art to ease access to said orders at the time of pick-up. For example, the orders can be arranged according to name and/or pickup time, or both.

One embodiment of the pick-up bay (8) of the instant disclosure, in practice, functions as follows. Users will arrive to the pick-up bay (8) at the appointed time they were informed of after placing their order on the three-dimensional virtual supermarket interface (12). Then they will queue up at one of the several stylized check-out bays (18). In one embodiment of the pick-up bay (8), it is contemplated that there will be at least ten checkout bays (18). However, it is important to note that this number is in no way limiting, and this disclosure contemplates any number of checkout bays (18) deemed to be advantageous for convenient, quick and effective customer check-out. Akin to toll-booths, it is contemplated in one embodiment that the checkout bays (18) will have a lighting system, or other indicating system known to those of skill in the art, for quickly indicating and communicating to a user which checkout bay is open and/or which checkout bay they should utilize.

In one embodiment of the pick-up bay (8), a computer or similar applicable technology known to those of skill in the art will be used to more efficiently manage user pick-up. For example, the computer will automatically stagger peak pick-up times with its order fulfillment scheduling to prevent user backup and congestion in picking up orders. For example, if a user orders their groceries on Friday for Saturday morning pickup, the computer will assign an earliest possible pick-up time based on volume management. It is prudent to note, however, that it is anticipated that the freedom provided to users by the presently disclosed system and method to pick up large orders quickly will result in more even distribution of shopping patterns throughout the duration of the week.

Once in the checkout bay (18), the user will swipe a credit card, license or other identifying card to bring their order forward. The order retrieval process will be similar in many ways to the retrieval of flight information at an air airport terminal via a credit card, driver's license or passport, prior to checking in. Once the order is called, in one embodiment, a 'procurement specialist,' computer or other method of identity verification known to those of skill in the art will verify the name on the order.

Once verified, employees or applicable automated technology inside the pick-up bay (8) will pull the order from the applicable storage facilities and the order will be transported (via any applicable, efficient and cost effective transport modality known to those of skill in the art) to the applicable check-out bay (18). The procurement specialist will then bring the order out to the user in their car, verify the user's identity if necessary, and assist the user in loading the order into his or her vehicle.

At this point in the transaction, if desired, the user can once again check the completeness of the order against their own list; and scan in any coupons they may have (as noted previously, applicable online manufacturer or retailer coupons have already been applied and reduced off the purchase price) to further reduce the price of the order.

At this time, the user can continue to pay for the transaction on the financial instrument that was processed when the order was transferred on the three-dimensional interface (12), by electronically signing a receipt, or pay for the transaction through the use a point of service terminal (a technology similar to the technology used in the self-serve aisle in traditional supermarket retailers) located in the checkout bay (18) that will accept cash or food stamps. This point of service secondary payment option at pick-up allows a broader spectrum of shoppers to participate in the online grocery store retailer disclosed herein.

In one embodiment of the procurement center (4), a separate area of either the fulfillment warehouse (6) or the pick-up bay (8) will be designated as a small retail space area designed for customer interaction. This area can be utilized by users to interact directly with customer service agents, for alcohol and cigarette pickup (important in jurisdictions where curbside alcohol and cigarette pickup is not legal), verification of age for goods whose sale is age dependent (e.g., alcohol and cigarettes), and any other interaction that requires human-to-human contact, whether by law or the nature of the transaction itself. However, again, it is important to note the majority of transactions, outside of these specifically enumerated "special" transactions, will take place in the pick-up bays (8) outside a traditional in-store retail environment.

In one embodiment of the disclosed system and method, an order will be held in a storage facility and guaranteed as fresh for only a fixed period of time that will be communicated to the user at the time of purchase in the three-dimensional virtual supermarket interface (12). If the user does not show up in the fixed period of time, without notifying the store, the user will be charged the full price of the order or a pre-determined percentage of the order. By implementing this policy, guaranteeing the order with a card and charging the user for "no show" transactions, individuals will be less likely to place an order and not show up.

In another embodiment of the pick-up bay (8) of the instant disclosure, the check-out bays (18) will be outfitted with gas pumps so that the tank of gas in the car can be filled via traditional modalities while the user is waiting for their pick-up order to be brought to them by the procurement specialist.

Also of note in this disclosure, it is contemplated that the procurement center (4) can be constructed via converting a traditional brick and mortar retail space into a fulfillment warehouse (6) and constructing the pick-up bays (8) in the parking lot in front of the former retail store.

Further, it is noted that the procurement centers (4) of the present disclosure can seamlessly co-exist alongside several different kinds of retail food stores and can be easily expanded to include fueling, dry cleaning, prescriptions and even movie rentals. In addition, it is contemplated in some embodiments that specialty delis and markets can exist with in the same shopping center as the procurement center (4), thus allowing for service to a wider range of potential customers.

The resultant combination of the three-dimensional virtual supermarket interface (12) and the procurement center (4) (comprised of the fulfillment warehouse (6) and the pick-up bay (8)) creates a system of Internet retail shopping that has all of the advantages associated with commerce in the online forum (i.e., accessibility, ease of use, selection of products, better pricing, and, importantly, the reduced amount of time it takes to complete a transaction) with few of the problems traditionally associated with the Internet grocery store retail environment and system that have kept online grocery shopping from realizing its potential.

For example, as the system and method of the present disclosure eliminates the need for delivery or extra staff to pick-up and collate orders, there is no need to charge additional overhead fees for ordering and delivery. Also the complexity and problems traditionally associated with product delivery, including temperature issues, in the traditional systems are eliminated.

In addition, the sensory issues and technology impediment that acted as an obstacle to previous grocery shopping forums on the Internet are greatly reduced, if not eliminated, by the three-dimensional virtual supermarket interface (12) that allows a user to visualize the grocery store environment as a whole, and individual products just as they would be able to in "real time" shopping in a traditional retail store, thereby increasing customer comfort and insuring the ability to browse.

Lastly, the present system and method does not suffer from the issues of high operating costs that have burdened previous online grocery store systems and methods.

By phasing out the current retail store model and focusing more on the data centers to process the orders and procurement centers for the pick up of the products, the disclosed system and method results in significant savings in labor (the employees in the store will be made up primarily of warehouse personnel, a small customer service staff and the checkout specialists), insurance and facility costs.

Also of note, outside the various time and cost efficiencies, the disclosed method and system are more environmentally friendly than the traditional model of retail grocery sales and can carry a much smaller carbon "footprint." By dealing directly with the customer through the web portal, the vendors can reduce the number of paper coupons they have to produce, saving the vendor both paper and expense. Further, the structure of the fulfillment warehouse allows the vendor to save space as the store can be more compact and better utilize vertical space (thus, a larger foot-print no longer needed), energy costs (due to the more efficient use of lighting and refrigeration means, as there are no longer any overriding aesthetic concerns), among others. Many of these savings can be passed on to customers, thereby increasing loyalty and offering another incentive to shopping in this way.

Thus, in summary, the disclosed system and method for Internet grocery shopping will not have the issues that have kept online grocery shopping from realizing its potential. There will be no need to charge fees for ordering or delivery. Order readiness will be a fraction of what it is in a traditional store because all of the procurement centers resources are focused on filling online orders quickly and efficiently, not trying to get the order filled while also running a traditional store. As such, the problems perpetuating the status quo of individuals obtaining the majority of their groceries from traditional brick and mortar venues have been removed, clearing the way for consumers to effectively engage with grocery shopping on an Internet forum, and receiving the numerous benefits and convenience associated therewith.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for providing an Internet-based grocery ordering and pick-up, comprising the following steps:
   providing an Internet-based three-dimensional virtual supermarket interface accessible to a user by the Internet through which said user can browse, search, and manipulate a grocery store item in a plurality of views for purchase and order, wherein said manipulation can comprise changing between a front, a rear, and a side view of said grocery store items;
   processing a user grocery store order placed on said Internet-based three-dimensional virtual supermarket interface by transmitting said order to a retail/warehouse hybrid procurement center designated by said user at the time of said order where grocery orders are fulfilled at said retail/warehouse hybrid procurement center, wherein said retail/warehouse hybrid procurement center is a retail store in its exterior façade and location with an interior structured as a warehouse with no retail qualities associated therewith;
   delivering said orders to a pick-up bay portion of said retail/warehouse hybrid procurement center where said orders are picked up by said user at a checkout bay portion of said retail/warehouse hybrid procurement center; and
   loading said order into said user's vehicle after said user has confirmed payment for said order.

2. The method for providing an Internet-based grocery ordering and pick-up of claim 1, further comprising:
   storing and categorizing information regarding products used by said user in the home by scanning the information of used products with a product scanner and transmitting said information to the three-dimensional virtual supermarket interface.

3. A method for providing an Internet-based grocery ordering and pick-up, comprising the following steps:
   providing an Internet-based three-dimensional virtual supermarket interface accessible to a user by the Internet through which said user can browse, search, and manipulate a grocery store item in a plurality of views for purchase and order, wherein said browsing comprises navigating along a representation of an aisle having said grocery store item thereon within a three-dimensional representation of a supermarket, wherein said representation of the aisle having said grocery store items thereon changes as the user navigates away from or towards the aisle;
   processing user grocery store orders placed on said Internet-based three-dimensional virtual supermarket interface by transmitting said order to a retail/warehouse hybrid procurement center designated by said user at the time of said order where grocery orders are fulfilled at said retail/warehouse hybrid procurement center, wherein said retail/warehouse hybrid procurement center is a retail store in its exterior façade and location with an interior structured as a warehouse with no retail qualities associated therewith;

delivering said orders to a pick-up bay portion of said retail/warehouse hybrid procurement center where said orders are picked up by said user at a checkout bay portion of said retail/warehouse hybrid procurement center; and loading said order into said user's vehicle after said user has confirmed payment for said order.

4. The method for providing an Internet-based grocery ordering and pick-up of claim 2, further comprising:

storing and categorizing information regarding products used by said user in the home by scanning the information of used products with a product scanner and transmitting said information to the three-dimensional virtual supermarket interface.

\* \* \* \* \*